US012348578B2

(12) United States Patent
Teglas et al.

(10) Patent No.: US 12,348,578 B2
(45) Date of Patent: *Jul. 1, 2025

(54) SYSTEM AND METHOD FOR LAUNCHING AND CONNECTING TO A LOCAL SERVER FROM A WEBPAGE

(71) Applicant: Open Text Corporation, Waterloo (CA)

(72) Inventors: Russell George Teglas, Arlington, MA (US); Samir Yasin Vaidya, Bangalore (IN)

(73) Assignee: OPEN TEXT CORPORATION, Waterloo (CA)

( * ) Notice: Subject to any disclaimer, the term of this patent is extended or adjusted under 35 U.S.C. 154(b) by 40 days.

This patent is subject to a terminal disclaimer.

(21) Appl. No.: 17/491,492

(22) Filed: Sep. 30, 2021

(65) Prior Publication Data

US 2022/0021727 A1    Jan. 20, 2022

Related U.S. Application Data

(63) Continuation of application No. 16/264,061, filed on Jan. 31, 2019, now Pat. No. 11,172,013.

(51) Int. Cl.
*H04L 67/02* (2022.01)
*G06F 16/957* (2019.01)
*H04L 67/141* (2022.01)
*H04L 69/00* (2022.01)
*H04L 69/16* (2022.01)

(52) U.S. Cl.
CPC ............ *H04L 67/02* (2013.01); *G06F 16/957* (2019.01); *H04L 67/141* (2013.01); *H04L 69/03* (2013.01); *H04L 69/162* (2013.01)

(58) Field of Classification Search
CPC .............................. H04L 67/02; G06F 16/957
See application file for complete search history.

(56) References Cited

U.S. PATENT DOCUMENTS

| 9,826,017 | B1 * | 11/2017 | Goldfeder | ............. G06F 21/566 |
| 11,245,537 | B2 | 2/2022 | Teglas | |
| 11,374,771 | B2 * | 6/2022 | Wentz | ................... H04L 9/3265 |
| 2002/0055966 | A1 * | 5/2002 | Border | .................. H04L 69/163 |
| | | | | 709/200 |

(Continued)

*Primary Examiner* — Joe Chacko
(74) *Attorney, Agent, or Firm* — Sprinkle IP Law Group

(57) ABSTRACT

A system comprising a processor and a computer readable memory coupled to the processor, the computer readable memory configured with a page processable by page processing code. The page can be configured to generate a set of random connection data usable by a local server program instance to verify that a connection request is from the page, launch the local server program instance, provide the set of random connection data to the local server program instance, create a client socket instance, send a connection request to the local server program instance to establish a connection between the client socket instance and a server socket instance of the server program instance and based on an acceptance of the connection request by the server program instance, complete the connection. The connection may be usable for bi-directional communication between the page and local server program instance.

12 Claims, 6 Drawing Sheets

(56) References Cited

U.S. PATENT DOCUMENTS

| | | | |
|---|---|---|---|
| 2002/0120782 A1* | 8/2002 | Dillon | H04L 67/563 |
| | | | 709/245 |
| 2014/0237351 A1* | 8/2014 | Seidl | H04L 67/02 |
| | | | 715/234 |
| 2014/0337959 A1* | 11/2014 | Garmark | G06F 21/335 |
| | | | 726/9 |
| 2015/0358328 A1* | 12/2015 | Kaplan | H04L 67/1095 |
| | | | 726/6 |
| 2016/0286005 A1* | 9/2016 | Bruce | G06F 21/71 |
| 2018/0227370 A1* | 8/2018 | Robles | H04L 9/3247 |
| 2019/0230090 A1* | 7/2019 | Kathiara | H04L 9/3247 |
| 2022/0131710 A1 | 4/2022 | Teglas | |

* cited by examiner

SYSTEM AND METHOD FOR LAUNCHING AND CONNECTING TO A LOCAL SERVER FROM A WEBPAGE

RELATED MATTER(S)

This application is a continuation of, and claims a benefit of priority under 35 U.S.C. 120 of, U.S. patent application Ser. No. 16/264,061 filed Jan. 31, 2019, now U.S. Pat. No. 11,172,013, entitled "SYSTEM AND METHOD FOR LAUNCHING AND CONNECTING TO A LOCAL SERVER FROM A WEBPAGE," which is hereby incorporated herein for all purposes.

TECHNICAL FIELD

This disclosure relates generally to web browsers or other code that processes pages. More particularly, this disclosure relates to systems and methods for extending the functionality of code that processes pages. Even more specifically, this disclosure relates to systems and methods for launching and connecting to a local server from a web page or other page.

BACKGROUND

Many web browsers allow users to add functionality to the browser through plug-ins or extensions that can be incorporated into the browser. The use of plug-ins and extensions to expand browser functionality has several shortcomings. One problem is that browser plug-ins and extensions are typically specific to a type of browser and cannot be used by browsers of different types. Consequently, an extension or plug-in author wishing to provide the same extended functionality for multiple browser types must create, update and deploy browser-specific plug-ins or extensions for each type of browser for which the extended functionality is to be provided. From the end-user perspective, the browser-specific nature of extensions and plug-ins means that an end-user wishing to add the same extended functionality to multiple browsers installed on the user's computer must download and install the correct extension or plug-in for each browser. Another issue is that existing plug-ins and extensions often become obsolete when a new version of a browser is released, requiring the plug-in or extension author to rewrite the obsolete plug-in or extension code and end-users to install the updated plug-in or extension.

SUMMARY

Embodiments of the present disclosure provide systems and methods for extending the functionality of a browser or other application using a cooperating server program. One embodiment of a system comprises a processor configured with page processing code capable of processing a page to render the page and a local server program. For example, the processor may be configured with a web browser and local server program. The system further comprises a computer readable memory coupled to the processor, the computer readable memory comprising a page, such as a web page, processable by the page processing code. The page can be configured to generate a set of connection data usable by a local server program instance to verify that a connection request is from the page, launch the local server program instance and provide the set of connection data to the local server program instance, create a client socket instance, send the connection request to the local server program instance to establish a connection between the client socket and a corresponding server socket of the server program instance and based on an acceptance of the connection request by the server program instance, complete the connection, wherein the connection is usable for bi-directional communication between the client socket instance and the server socket instance.

Another embodiment may comprise comprises a processor and a computer readable memory coupled to the processor, the computer readable memory comprising a set of computer readable instructions executable by the processor to receive a request from a client computer for a page, such as a web page, and return the page to the client computer, where the page processable by page processing code (such as a web browser) to generate a set of connection data usable by a local server program instance to verify that a connection request is from the page, launch the local server program instance and provide the set of connection data to the local server program instance, create a client socket instance, send the connection request to the local server program instance to establish a connection between the client socket and a corresponding server socket of the server program instance and based on an acceptance of the connection request by the server program instance, complete the connection, wherein the connection is usable for bi-directional communication between the client socket instance and the server socket instance.

Another embodiment of a system may comprise a network environment comprising a client computer and server computer coupled via a network. The client computer is configured with page processing code, such as a web browser, and a server program. The network environment is configured with a page, such as a web page, that can be processed by the page processing code to render the page. The page can be configured to generate a set of connection data usable by a local server program instance to verify that a connection request is from the page, launch the local server program instance and provide the set of connection data to the local server program instance, create a client socket instance, send the connection request to the local server program instance to establish a connection between the client socket and a corresponding server socket of the server program instance and based on an acceptance of the connection request by the server program instance, complete the connection, wherein the connection is usable for bi-directional communication between the client socket instance and the server socket instance.

Another embodiment may comprise a computer program product comprising a non-transitory computer readable medium storing a page, such as a web page, the web comprising instructions configured to generate a set of connection data usable by a local server program instance to verify that a connection request is from the page, launch the local server program instance and provide the set of connection data to the local server program instance, create a client socket instance, send the connection request to the local server program instance to establish a connection between the client socket and a corresponding server socket of the server program instance and based on an acceptance of the connection request by the server program instance, complete the connection, wherein the connection is usable for bi-directional communication between the client socket instance and the server socket instance.

Another embodiment may comprise a computer program product comprising a non-transitory computer readable medium storing a set of computer readable instructions executable by the processor to receive a request from a client computer for a page, such as a web page, and return the page to the client computer, where the page is configured to generate a set of connection data usable by a local server program instance to verify that a connection request is from the page, launch the local server program instance and provide the set of connection data to the local server program instance, create a client socket instance, send the connection request to the local server program instance to establish a connection between the client socket and a corresponding server socket of the server program instance and based on an acceptance of the connection request by the server program instance, complete the connection, wherein the connection is usable for bi-directional communication between the client socket instance and the server socket instance.

According to one embodiment, the set of connection data and the connection request comprise randomly generated data. By way of example, but not limitation, the randomly generated data may comprise a port number for a port on which the local server program instance is to listen for the connection request. As another example, the randomly generated data comprises a launch id to be used by the local server program instance to verify that the connection request is from the page. The randomly generated data includes a port number for a port on which the local server program instance is to listen for the connection request and a launch id to be used by the local server program instance to verify the connection request is from the page. According to one embodiment, the connection request is an HTTP GET request that includes the randomly generated launch id.

The page may be configured to compose a uniform resource locator (URL) including the port number on a local host and the launch id and create the client socket instance using the URL. According to one embodiment, the client socket instance is a client WebSocket instance.

The page may be configured to launch the local server program instance and provide the set of connection data to the local server program instance by sending a launch request to an operating system to launch the local server program instance. The launch request may include an indicator of a protocol that the local server program is registered to handle, the port number to be passed to the local server program instance and the launch id to be passed to the local server program instance.

The server program instance may be executable to receive a connection configuration launch id and a port number for a port from an operating system based on a request by the page, create the server socket instance bound to a loopback address, listen on the server socket instance for the connection request on the port, extract a connection request launch id from the connection request and based on a determination that the connection configuration launch id and connection request launch id match, accept the connection request. The port number may be a random port number generated by the page and the connection configuration launch id and connection request launch id may comprise a string randomly generated by the page. The local server program may be executable to extract the connection configuration launch id and port number from command line attributes from an operating system.

One embodiment of a method comprises executing page processing code, such as a web browser, to render a page, such as a web page. The method may further include the page generating a set of connection data, the set of connection data comprising randomly generated data usable by a local server program instance to verify that a connection request is from the page, launching the local server program instance and providing the set of connection data to the local server program instance, creating a client socket instance, sending a connection request to the local server program instance to establish a connection between the client socket instance and a corresponding server socket instance of the server program instance, the connection request comprising the randomly generated data, and based on an acceptance of the connection request by the server program instance, completing the connection. The connection is usable for bi-directional communication between the client socket instance and the server socket instance.

According to one embodiment, the set of connection data and the connection request comprise randomly generated data. By way of example, but not limitation, the randomly generated data may comprise a port number for a port on which the local server program instance is to listen for the connection request. As another example, the randomly generated data comprises a launch id to be used by the local server program instance to verify that the connection request is from the page. The randomly generated data includes a port number for a port on which the local server program instance is to listen for the connection request and a launch id to be used by the local server program instance to verify the connection request is from the page. According to one embodiment, the connection request is an HTTP GET request that includes the randomly generated launch id.

The method may further comprise composing, by the page, a uniform resource locator (URL) including the port number on a local host and the launch id and creating, by the page, the client socket instance using the URL. The client socket instance may be a client WebSocket instance.

According to one embodiment, launching the local server program instance and providing the set of connection data to the local server program instance comprises sending, by the page, a launch request to an operating system to launch the local server program instance, the launch request including an indicator of a protocol that a local server program is registered to handle, the port number to be passed to the local server program instance and the launch id to be passed to the local server program instance.

The method may further include the local server program instance receiving a connection configuration launch id and a port number for a port from an operating system based on a request by the page, creating the server socket instance and binding the server socket instance to a loopback address, listening on the server socket instance for the connection request on the port, extracting a connection request launch id from the connection request, based on a determination that the connection configuration launch id and connection request launch id match, accepting the connection request, wherein the port number is a random port number generated by the page and the connection configuration launch id and connection request launch id comprise a string randomly generated by the page. The local server program is executable to extract the connection configuration launch id and port number from command line attributes from an operating system.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features and wherein.

DETAILED DESCRIPTION

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

Embodiments of the present disclosure provide systems and methods for extending the functionality of a browser (or other application) using a cooperating server program. According to one embodiment, a page being rendered is configured to launch an instance of a server program and establish a connection (e.g., an application layer connection) to the program instance. The connection provides a two-way communications channel, such as a full-duplex, bidirectional communications channel, to enable bidirectional communications between the page and the program instance. As such, the page may communicate with the program instance to pass data to be processed to the program instance and the program instance may communicate with the page to pass data to be processed to the browser or update the page as rendered to a display. The connection may be a persistent connection that, once established, remains open until the browser or the program instance closes the connection. According to one embodiment, the page and program instance are configured to establish a socket connection using a protocol supported by multiple types of web browsers, such as a WebSocket connection. As such, a single installation of the program may be used to extend multiple browsers. Moreover, as the program may be browser-independent, the program is less likely to become obsolete due to browser updates.

The program instance may provide a variety of functionality not provided by the browser. By way of example, but not limitation, the program instance may provide advanced content transfer and manipulation capabilities to a web page that are not provided by the browser or the HTML or JavaScript running in the web page. In some cases, the program instance may provide a graphical user interface (GUI) apart from the web page so that a user can use additional tools provided by the program.

Figure 1:
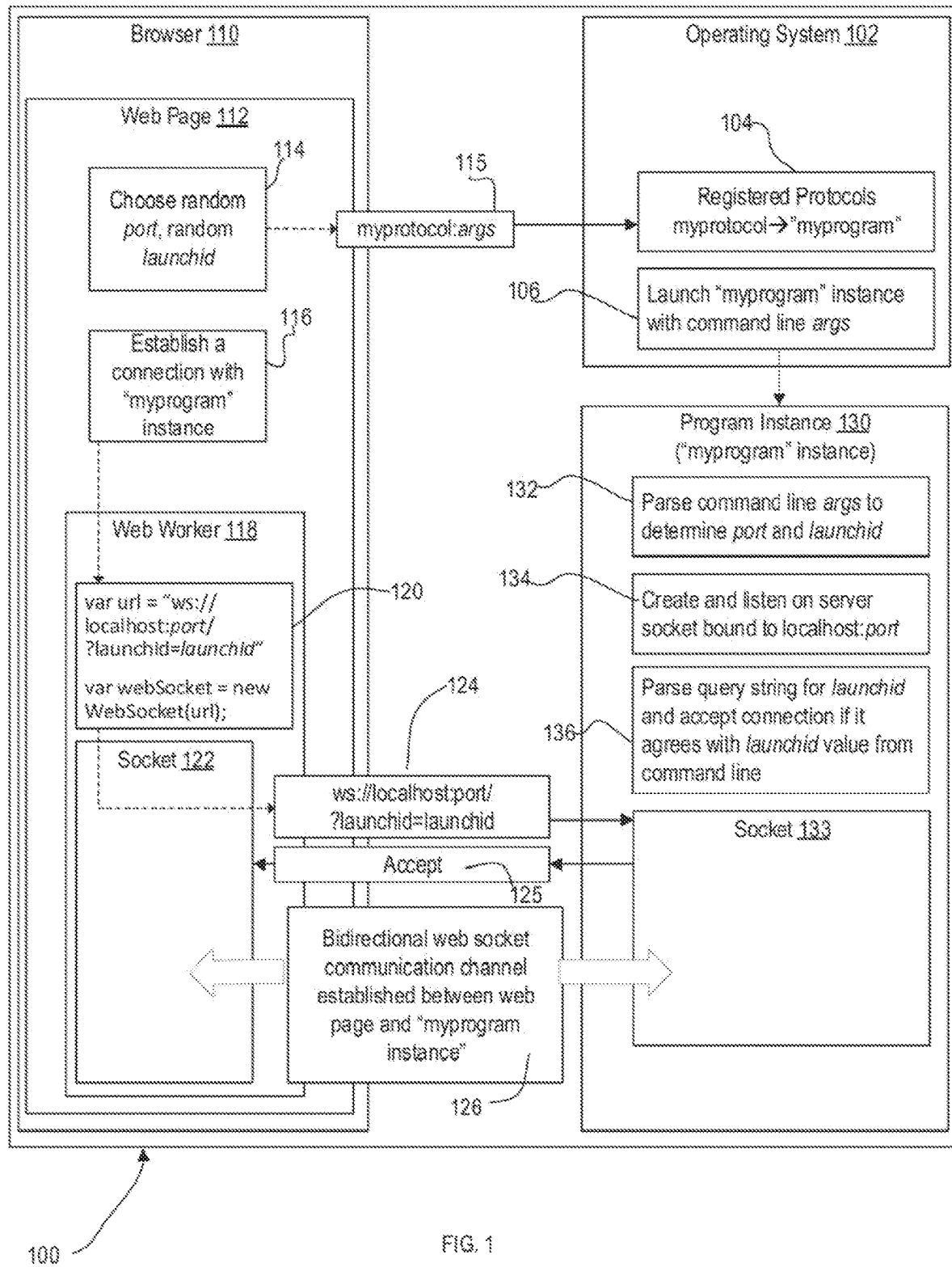
FIG. 1 is a block diagram illustrating one embodiment of a software system launching and connecting to a local server.

FIG. 1 is a block diagram of one embodiment of a computing device 100 with extended browser functionality. Computing device 100 comprises computer hardware, such as a processor, memory, input/output devices, and a network interface to connect to a network. The processor may be configured to execute computer executable instructions. For example, computing device 100 further includes an operating system 102 configured to be executed on the processor to provide various services to programs (applications) and manage or act as an intermediary between programs and the various hardware components, a web browser 110 configured to be executed on the processor, where browser 110 may be a portion of operating system 102 in some embodiments, and a server program (an instance 130 of which is illustrated) configured to be executed to provide extended functionality. According to one embodiment, server program instance 130 is a local program that executes on the same computing device 100 as browser 110. For example, browser 110 and server program instance 130 may execute on the same processor.

In the illustrated embodiment, browser 110 is rendering a web page 112. Rendering web page 112 may include browser 110 executing on a processor to process HTML or other markup language, and related resources, such as scripts, style sheets, image files, video files, audio files or other resources, potentially retrieved from multiple network locations, that are processed by browser 110 to render web page 112. Web page 112 may comprise instructions (e.g., HTML, JavaScript or other instructions) interpretable or executable by the browser 110 to implement various functionality. Thus, web page can be said to perform various operations such as providing a user interface (UI), launching and connecting to an instance (e.g., instance 130) of the server program, communicating with the server program or other operations.

As will be appreciated by the skilled artisan, many browsers implement single threaded rendering engines, such that all (or most) rendering operations on a web page are executed in a single thread. Examples of such rendering operations typically include, but are not limited to, parsing HTML (or other markup language) into a DOM and executing scripts embedded in or referenced by the markup language. In some embodiments, at least a portion of the instructions of web page 112 can be configured to be interpreted or executed in another thread from the main web page thread. For example, web page 112 can be configured so that the connection with server program instance 130 is created or maintained by a separate thread from the main web page thread so that creating or maintaining the connection does not block processing of the markup language or other scripts, such as UI scripts, executed in the main web page thread.

As discussed above, web page 112 is configured to launch server program instance 130. To facilitate launching of server program instance 130, the server program can be registered in registry 104 of operating system 102 as a handler for a custom protocol. In FIG. 1, for example, the server program "myprogram" is registered in registry 104 as the handler for "myprotocol". This registration may be performed as part of installing the server program or at another time. The mechanism for registering a program to handle a protocol is operating system dependent and the server program can be registered to handle the custom protocol using the appropriate mechanism for the operating system 102. For a MICROSOFT WINDOWS operating system, for example, such registration can be recorded in a WINDOWS registry key. For instance, the following registry script is configured to register myprogram.exe to be launched when a launch request using "myprotocol" is received:

```
reg add
    HKCU\SOFTWARE\Classes\myprotocol\shell\open\command/t
    REG_EXPAND_SZ/d
    "%LOCALAPPDATA%\Programs\myprogram\myprogram.exe
    \"%%1\""/f
```

In this example, other components running on computing device 100, such as browser 110, can launch an instance of the server program (e.g., launch an instance of myprogram.exe) using a universal resource identifier (URI) such as "myprotocol:arg1".

Moreover, web pages being processed by different browsers on computing device 100 can launch and connect to instances of the same installed server program.

Web page 112, as indicated by block 114, may include instructions executable by browser 110 to generate a launch request 115 to operating system 102 to cause operating system 102 to launch an instance 130 of the server program. According to one embodiment, web page 112 is configured to automatically send launch request 115 as browser 110 is loading page 112. In another embodiment, web page 112 is configured to generate launch request 115 responsive to user interaction with the displayed web page after the web page has loaded. Launch request 115 indicates the program to be launched (e.g., by indicating the custom protocol or otherwise indicating the program to be launched) and arguments. In the illustrated embodiment, for example, request 115 includes a URI indicating the custom protocol associated with the server program and includes arguments to be passed to server program instance 130 when the instance is launched.

The launch request arguments can include a set of connection data to be used by web page 112 and server program instance 130 for establishing a connection. By way of example, but not limitation, the arguments may include a launch id and port number. The launch id, according to one embodiment, comprises any data that can be used to confirm that a connection request to server program instance 130 is from a web page that is permitted to connect to server program instance. For example, the launch id may be used to confirm that a connection request is from a web page that launched server program instance 130. The launch id may be a number, a string or other data. The port number indicates the port number on which a launched instance of the server program is to listen for connection requests.

Launch request 115 may include a set of random connection data to be used by web page 112 and server program instance 130 for establishing a connection. According to one embodiment, web page 112 includes instructions executable to generate a random launch id and random port number to be included as arguments of launch request 115. For example, web page 112 may include a random string generator function to cause browser 110 to generate a random launch id and a random number generator to cause browser 110 to generate a random port number. The random number generator for selecting the port may be configured to select a random port number in a range or to avoid ports used by commonly installed applications. As an example, web page 112 may be configured to generate a random port number in the range [10000,65535].

Launch request 115, according to one embodiment, includes a custom URI usable to launch server program instance 130. For example, web page 112 may be configured to compose a custom URI having the form myprotocol:port:launchid. Thus, if the launch id string is agdx3ofpmbs and the port is 23845, web page 112 can compose the URI myprotocol:23845:agdx3ofpmbs. Web page 112 can then use the custom URI to launch an instance of the server program (e.g., to launch instance 130).

The mechanism for a web page to launch a server program may be browser dependent. As one example, web page 112 can be executable to generate a statement such as:

window.location.href=myprotocol:23845:
        agdx3ofpmbs;

which will cause certain browsers to request that the operating system launch an instance of the program associated with "myprotocol" and pass the arguments to the instance as command line arguments. As will be appreciated, the foregoing is provided by way of example and not limitation and the instructions for generating launch request 115 using the custom URI (or other launch request) can be configured as appropriate for the browser to which page 112 is served.

Responsive to receiving launch request 115, operating system 102 determines that the server program is registered in registry 104 for "myprotocol" and, at block 106, launches server program instance 130, passing the arguments from request 115 to server program instance 130 (e.g., as command line arguments). The arguments passed to the server program instance may include a set of connection data to be used by server program instance 130 when establishing a connection with web page 112. The set of connection data received by server program instance 130 from operating system 102 or otherwise received by the server program instance for use in establishing a connection with a page may be referred to as connection configuration data. The connection configuration data may include, for example, the port on which server program instance 130 is to listen for a connection request, a launch id, or other connection configuration data. As discussed above, the port may be dynamically selected by web page 112. Even more particularly, the port may be randomly selected by web page 112.

Returning to web page 112, the web page includes instructions for establishing a connection, such as an application layer socket connection, with the launched server program instance 130. According to one embodiment, the connection is established in a different thread from the thread in which block 114 is executed or a different thread than the main web page thread. For example, as represented at block 116, web page 112 may launch a web worker 118 that includes instructions executable to connect to server program instance 130 as a client. The first thread (e.g., the main web page thread) and web worker 118 can communicate with each other asynchronously using web worker application program interfaces (API) (e.g., window.postMessage/window.onmessage javascript API). The first thread can be configured to pass the connection data (e.g., launchid and port) to web worker 118.

Web worker 118 is executable to create a connection with server program instance 130. At block 120, web worker 118 is configured to compose a set of socket configuration information that is used to create a socket instance. For example, at block 120, web worker 118 composes a URI, such as a URL, that will be used to connect to server program instance 130. The URI may include a host name or address and a set of connection data, such as a port and launch id. For example, web worker 118 can be configured to compose the URI by inserting the port and launchid passed from the first thread into the URI ws://localhost:<port>/?launchid=<launchid>. Using the example connection data from above, web worker 118 can thus compose the URI:

ws://localhost:23845/?launchId=agdx3ofpmbs.

The web worker uses the set of socket configuration information to create a client socket instance 122, which may be an object instance that represents an end-point for sending or receiving data. According to one embodiment, socket instance 122 is a WebSocket instance. Web worker 118 may use a WebSocket constructor to create the new WebSocket instance using the URL to which to connect. For example, web worker 118 can create socket instance 122 using the URL ws://localhost:23845/?launchId=agdx3ofpmbs. Web worker 118 sends a connection request 124 to connect to server program instance 130, where the connection request 124 is in a format known to server program instance 130. The connection request may include the set of connection data. According to one embodiment, connection request 124 comprises an HTTP request (e.g., an HTTP GET request). Even more particularly, connection request 124 may comprise a WebSocket handshake, such as:

GET ws://localhost:23845/?launchId=agdx3ofpmbs/ HTTP/1.1

Origin: http://example.com

Connection: Upgrade

Host: localhost

Upgrade: websocket

If connection request 124 is accepted, the server program instance 130 may return an acceptance confirmation 125. If the acceptance confirmation is valid based on the communication protocol being used, a connection 126 can be considered established between web worker 118 and server program instance 130 and the state of the socket instance 122 can be updated to reflect that connection 126 is open. Web worker 118 can be configured to notify the main web page thread (or other thread) that the socket connection 126 has been established. Other components of web page 130 (for example, scripts executing in the main web page thread or other thread) may pass data to web worker 118 and web worker may communicate the data to instance 130 using socket instance 122. Similarly, web worker 118 can pass data received via connection 126 to other components.

Turning to server program instance 130, server program instance 130 is executable to receive a set of connection configuration data. According to one embodiment, server program instance 130 is configured to parse the command line arguments received from operating system 102 at launch to extract the connection configuration data. For example, as indicated at block 132, server program instance 130 parses the command line arguments to extract the port number and launch id. The port number indicates the port on which server program instance 130 is to listen for connection requests and the launch id is used to determine whether to allow or deny connection requests, as discussed below. A launch id received from the operating system 102 or otherwise received prior to a connection request and that is to be used as part of the decision whether to allow or deny a connection request can be referred to as a connection configuration launch id.

At block 134, server program instance 130 creates a server socket instance 133 according to a protocol (e.g., a server WebSocket instance), binds the server socket instance 133 to an address and listens on the server socket 133 for requests to connect. According to one embodiment, server program instance 130 binds server socket instance 133 to port on the loopback address of computing device 100 (typically the IP address 127.0.0.1) or otherwise binds server socket instance 133 to the local host. For example, if the set of configuration data includes the port 23845, server program instance 130 can bind socket instance 133 to 127.0.0.1:23845.

Server program instance 130 is configured to listen using server socket instance 133 for connection requests on the port (e.g., 127.0.0.1:23845). When server program instance 130 receives a connection request, such as connection request 124, on the designated port, server program instance 130 parses the request 124 for connection data and compares connection data from the connection request (connection request connection data) with the connection data received at launch (the connection configuration data) (block 136). According to one embodiment, server program instance 130 may be configured to parse a URL of the form "ws://localhost<port>/?launchid=<launchid>" or otherwise parse information in a received connection request 124 to extract the launch id from the query string. The launch id extracted from the connection request can be referred to as a connection request launch id. Server program instance 130 compares the launch id extracted from the query string (the connection request launch id) to the launch id received in the command line arguments (the connection configuration launch id). Using the example set of connection data from above, server program instance 130 can parse connection request 124 to extract agdx3ofpmbs from the query string and compare agdx3ofpmbs to the launch id passed by operating system 102.

If the connection data extracted from the connection request and the connection data received at launch do not match, server program instance 130 rejects the web socket connection attempt. For example, if the connection request launch and the connection configuration launch id received in the command line parameters do not match, server program instance 130 rejects the request. If the connection request data and connection configuration data match—for example if the connection request launch id and connection request launch id match—server program instance 130 sends the appropriate response to establish connection 126 (e.g., a WebSocket connection) between web worker 118 of web page 112 and server program instance 130 launched by web page 112. At this point, web page 112 and server program instance 130 can exchange messages with each other via socket connection 126 established on behalf of web page 112 by the web worker 118, with server program instance 130 acting as a server.

Web page 112 and server program may be configured to provide a wide degree of functionality depending on implementation. As just one example, web page 112 may be configured to provide a UI that allows a user to browse, select and view files stored on a remote server and the server program may be configured to download files and provide advanced content editing functionality. In this example, web page 112 may be configured to launch server program instance 130 based on user interaction with the rendered web page (for example selection of a file) and launch web worker 118 to connect to server program instance 130. When the main web page thread receives an indication that the connection between socket instance 122 and socket instance 133 is open, main web page thread can pass the selected file identification to web worker 118 via the web worker API and web worker 118 can pass the file identification to server program instances via connection 126. As server program instance 130 downloads the file, server program instance 130 can pass messages indicating the download progress of the file to web worker 118 via connection 126 and web worker 118 can pass the messages to the main web page thread via the web worker API. In this example, web page 112 may include user interface scripts executable to display the download progress in the display of rendered web page 112. Server program instance 130 may provide its own UI, separate from web page 112, with tools to allow a user to edit the file or perform other operations on the file.

In the prior examples, the port number on which server program instance 130 listens is a random port number. In other embodiments, the port number may be fixed. In such an implementation, the launch request 115 can include the fixed port number or omit the port number. If the fixed port number is the default port number for a protocol, the port number may be implied in connection request 124 based on the protocol used or specified in the connection request. The use of a fixed port may increase the likelihood of conflict with another service running on computing device 100. Moreover, in one embodiment, operating system 102 may be configured to launch server program instance 130 when a desktop login session begins with server program instance 130 configured to listen on a fixed port. Launching server program instance 130 at desktop login may result in a reduced user experience because, if the server program is not running for some reason, it may not be clear to the end user how to restart it in their desktop login session. The use of a fixed port number and launching server program instance login may result in a single instance of the server program serving multiple web pages, including web pages running in browsers in different desktop login sessions, all using the same port.

Further, in some embodiments, web page 112 can be configured to connect to server program instance 130 in the main web page thread. Establishing the connection using a second thread (e.g. for example using a web worker), however, can prevent the processing associated with establishing the connection from blocking execution of the main web page thread and, in particular, prevent blocking of UI scripts that are not dependent on establishing the connection.

Server program instance 130 may implement additional or alternative mechanisms to allow or deny connections. For example, server program instance 130 may allow or deny connections based on an origin. As will be appreciated, when a browser loads a JavaScript resource for a web page from a web site (typically but not necessarily the from the same web site that served the markup language file for the web page), the browser can remember the host associated with the JavaScript as the JavaScript's origin. Whenever a browser makes HTTP request using the XmlHttpRequest or fetch API or makes a WebSocket connection request using the WebSocket constructor, the browser can send an origin request header indicating the origin of the web site from which the JavaScript that is making the request was downloaded whenever this origin differs from that of the web page file (e.g., HTML file or other file) that caused the browser to load the JavaScript. That is, when the browser sends a cross-origin request, the browser includes the origin of the JavaScript that caused the request to be sent in an origin header of the cross-origin request. To prevent web scripts served from unwanted origins from launching and/or connecting to the server program, the server program can be configured with a whitelist of trusted origins. When a connection request is encountered with an unknown origin, the server program instance can either prompt the user and ask whether the origin should be trusted or reject the request if its origin is not in the whitelist. In addition or in the alternative, the server program may be provided with a blacklist of origins such that server program instance 130 denies connection requests containing blacklisted origins.

Further, while embodiment of FIG. 1 illustrates a web browser 110 rendering a web page 112, this is merely illustrative. Other embodiments of a computing device may comprise other types of page processing code, such as mobile applications or other applications configured to process pages. A page can be provided to the page processing code, where the page is processable by the page processing code to launch and connect to a server program instance as described herein.

Figure 2:
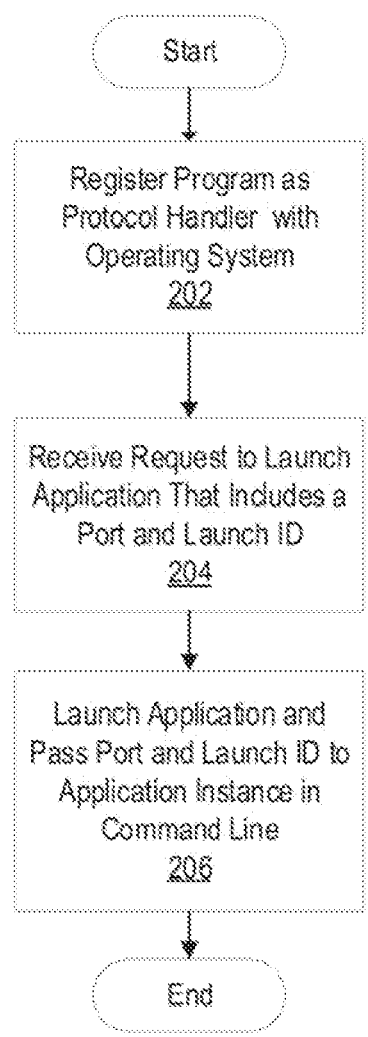
FIG. 2 is a flow chart of one embodiment of a method for configuring a computing device to launch a server program and launching the server program.

FIG. 2 is a flow chart of one embodiment of a method for configuring a computing device to launch a server program and launching an instance of the server program, such as instance 130. At step 202, the server program is registered with the operating system of a computing device as a protocol handler for a protocol. In the example of FIG. 1, "myprogram" is registered with operating system 130 as the handler for "myprotocol." Step 202, according to one embodiment, may be performed by the installer code for the server program when the server program is installed. At step 204, the operating system receives a request to launch the server program and an associated set of connection data, such as launch id and port number. For example, the operating system may receive a request referencing a protocol for which the server program is registered to handle. In FIG. 1, for instance, operating system 102 receives launch request 115. At step 206, the operating system launches an instance of the server program responsive to the launch request and passes the instance the associated set of connection data as, for example, command line arguments. For example, operating system 102 launches server program instance 130 and passes arguments received in launch request 115 to server program instance as connection configuration data. According to one embodiment, step 202 is repeated for each server program installed on the computing device and steps 204 and 206 are repeated for each launch request to launch an instance of an installed server program. FIG. 2 is merely an illustrative and the disclosed subject matter is not limited to the ordering of or number of steps illustrated. Embodiments may implement additional steps or alternative steps, omit steps, or repeat steps.

Figure 3:
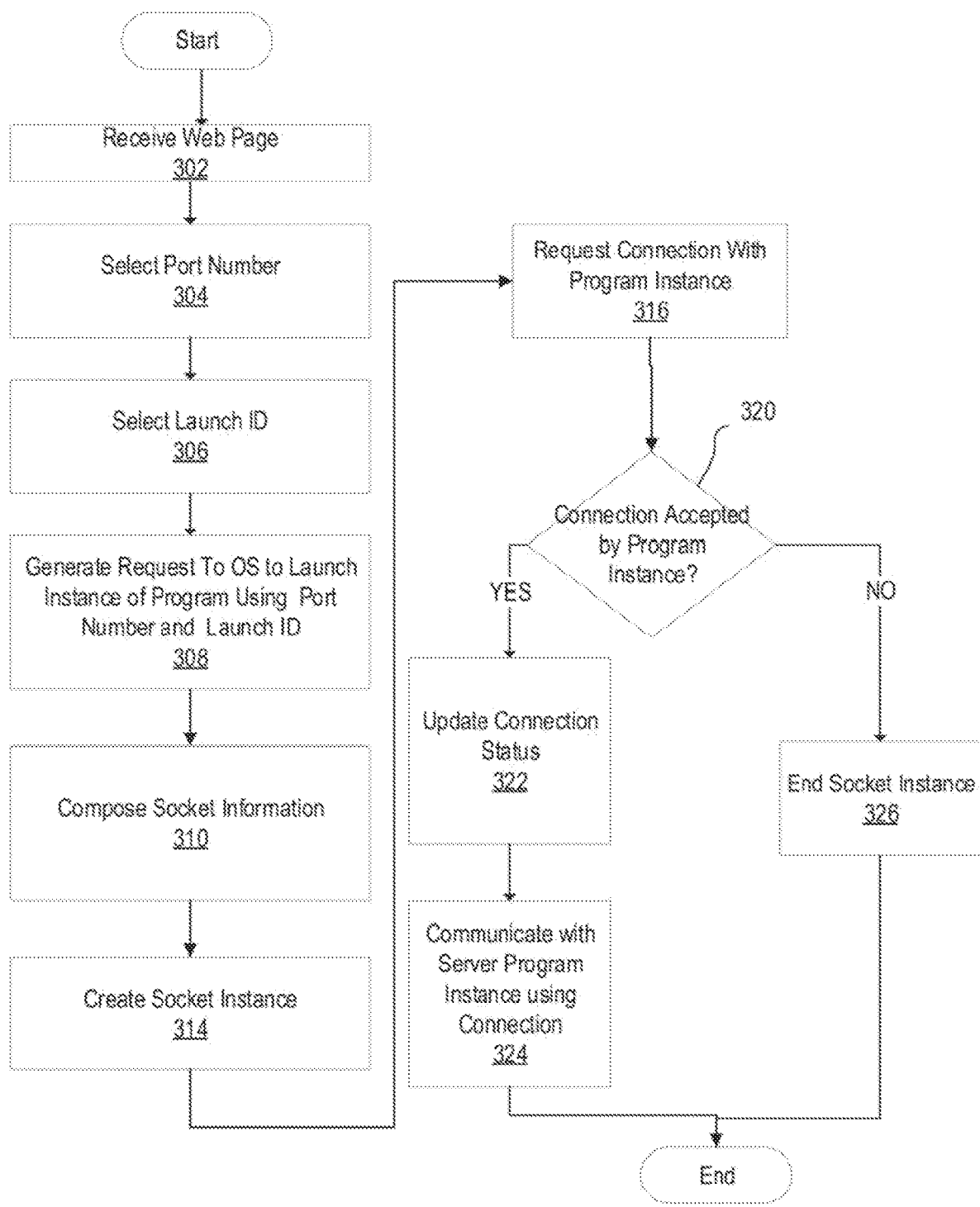
FIG. 3 is a flow chart of one embodiment of a client-side method for launching and connecting to a server program instance.

FIG. 3 is a flow chart of one embodiment of a client-side method for launching and connecting to a server program instance. In various embodiments, the method of FIG. 3 may be implemented by page processing code processing a page. For example, FIG. 3 may be implemented by web browser 110 processing web page 112. Some steps may be performed by the page; that is, some steps may be performed through interpretation or execution of instructions of the page by the page processing code. In various embodiments, one or more steps of FIG. 3 may be performed in a thread that is independent of a main thread that is rendering the page. For example, one or more steps of FIG. 3 may be performed by a web worker that executes in a different thread than a main web page thread of a browser that is rendering a web page.

At step 302, page processing code receives and begins rendering of a page. For example, web browser 110 receives and renders web page 112. Receiving and rendering the page may include, for example, receiving and processing an initial page file, such as a file containing markup language (e.g., HTML) and, in some cases, embedded scripts, and receiving and processing resources referenced in the initial page file, such as style sheets, scripts, images, videos. The page being rendered can be configured to launch and connect to an instance of a server program (e.g., program server instance 130).

According to one embodiment, the page selects a set of connection data for connecting to an instance of a server program. For example, at step 304, the page is executed to select a port number and, at step 306, to select a launch id. As discussed above, the port number and launch id may be randomly generated.

At step 308, the page is executed to generate a request (e.g., launch request 115) to the operating system of the computing device to launch an instance of the server program. For example, the page may be configured to compose a custom URI having the form myprotocol:port:launchId and use the custom URI to launch an instance of the server program (e.g., to launch instance 130).

At step 310, the page is executed to compose a set of socket information that is used in creating a socket instance (socket) as an endpoint for communicating with the server program instance. According to one embodiment, the page is configured to compose a URI, such as a URL, that will be used to connect to server program instance 130. The URI may include a host name or address and a set of connection data (connection request connection data), such as a port and launch id. For example, the URI may be composed by inserting the port number and launch id into the URI ws://localhost<port>/?launchid=<launchid>. Using the example connection data from above, the page can compose the URI: ws://localhost:23845/?launchId=agdx3ofpmbs.

At step 314, the page is executed to create a client socket instance, such as client socket instance 122, representing an endpoint for communicating with the server program instance. As will be appreciated, the client socket instance may be an object that represents an end-point for sending or receiving data. According to one embodiment, a WebSocket constructor is used to create a new WebSocket instance using the URL to which to connect. For example, a WebSocket constructor may be used to create a new WebSocket instance using the URL ws://localhost:23845/?launchId=agdx3ofpmbs.

At step 316, a connection request, such as connection request 124, is sent by the page to the server program instance using the client socket instance, where the connection request is in a format known to server program instance 130. According to one embodiment, the connection request may be an HTTP request. Even more particularly, the connection request may comprise a WebSocket handshake.

At step 320, a determination is made if the connection request was accepted by the server program instance. For example, it is determined if the server program instance returned an appropriate response indicating that the connection is accepted. If the connection was accepted the connection can be considered established and the page completes the connection from the client side. For example, the client socket instance can be updated, at 322, to represent that the socket instance is connected (e.g., that the connection is open). At step 324, the page and server program instance can communicate using the connection between the client socket instance and the server socket instance. The connection may be a persistent connection that remains open until terminated by the page or server program instance. If the connection request is not accepted (as determined at step 320), the client socket instance is terminated (step 326).

As indicated above, one or more steps of FIG. 3, may be implemented in a different thread from the main thread rendering the page. According to one embodiment, the page can be executed to launch a second thread in which code to perform one or more steps is executed. More particularly, a page can be executed to launch a web worker and pass the set of connection data to the web worker. One or more of steps step 310, 314, 316, 320, 322, 324 or other steps may be performed by the web worker. According to one embodiment, the web worker continues to execute until the client socket instance is terminated.

FIG. 3 is merely an illustrative example and the disclosed subject matter is not limited to the ordering of or number of steps illustrated. Embodiments may implement additional steps or alternative steps, omit steps, or repeat steps.

Figure 4A:
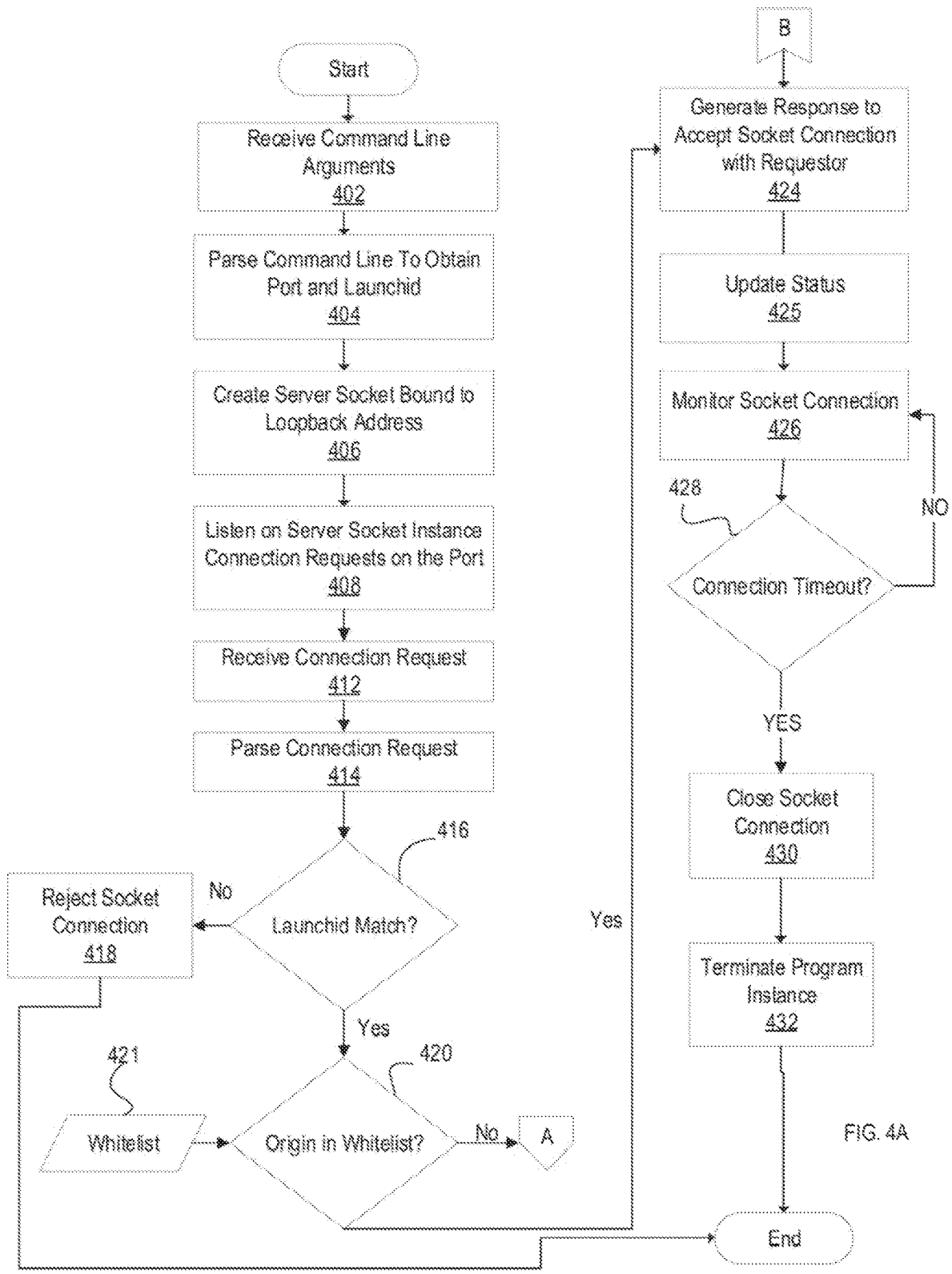
FIG. 4A and FIG. 4B are a flow chart of one embodiment of a server-side method for creating a connection between a page and server program.
Figure 4B:
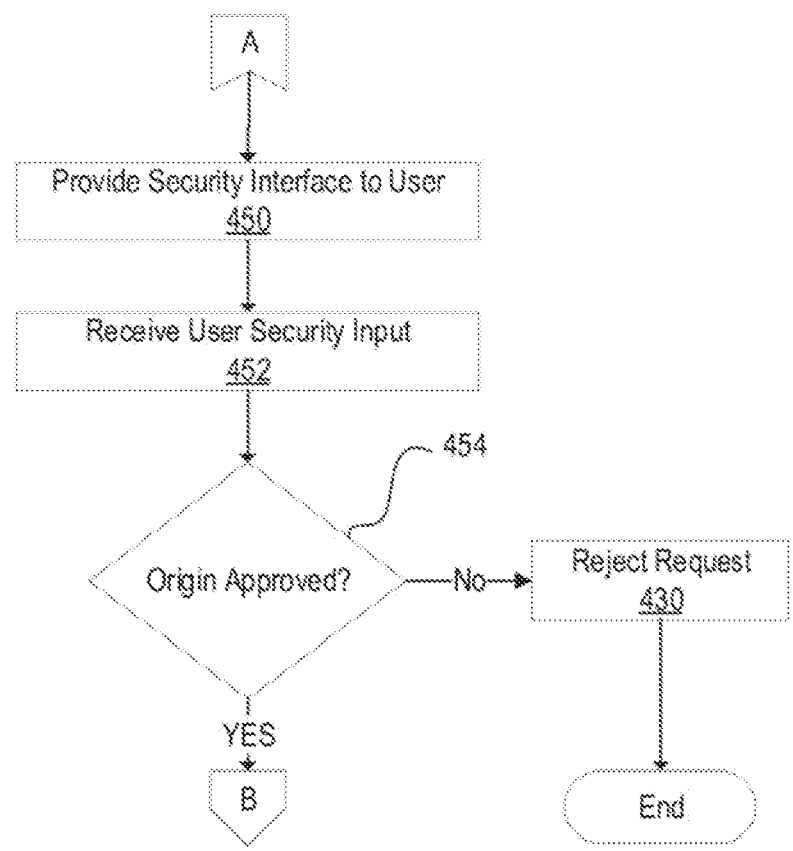

FIG. 4A and FIG. 4B are a flow chart of one embodiment of a server-side method for establishing a connection between a page and server program. In various embodiments, the method of FIGS. 4A and 4B may be performed by a program configured to act as a server, such as by server program instance 130 of FIG. 1.

The server program instance can be configured with a set of connection configuration data that is used to create a connection with a page. According to one embodiment, the connection configuration data may be a set of connection data generated by the page and passed to the server program instance when the instance is launched. For example, the operating system (e.g., operating system 102) can pass the connection configuration data to the server program instance as command line parameters when the server program instance is launched, and the server program instance can parse the command line parameters to extract the connection configuration data. According to one embodiment, the operating system can pass a port number and launch it to the server program instance and the server program instance can parse the received command line arguments (step 402) for a port number and a connection configuration launch id (step 404).

At step 406, the server program instance creates a server socket instance (e.g., server socket instance 133), such as a server Websocket instance, and binds the server socket instance to a port. According to one embodiment, server program instance 130 binds server socket instance to the port on the loopback address of a computing device (e.g., computing device 100) or otherwise binds the server socket instance to the local host. The port number of the port to which the server socket instance is bound may be a port number included in the connection configuration data received by the server program instance. Using the example port number 23845, server program instance 130 of FIG. 1 may bind socket instance 133 to 127.0.0.1:23845. At step 408, the server program instance listens on the server socket instance for connection requests on the given port.

The server program instance receives a connection request on the port (step 412), where the connection request is of a known format, and parses the connection request for connection data and other parameters (step 414). For example, the server program instance can be configured to parse the connection request for a launch id. The server program instance may also parse the connection request for other information, such as an origin in a cross-origin request.

At step 416, the server program instance can compare connection data received in the connection request (connection request connection data) to the connection data received at launch or otherwise passed to the server program instance (connection configuration data). For example, the server program instance can compare a connection request launch id extracted from the connection request with a connection configuration launch id received at launch.

If the connection data does not match, the server program instance rejects the connection (step 418). If the connection does match—for example, if the launch ids match—the server program instance can accept the connection or, in some embodiments, implement further measures to ensure the security of the connection. In the illustrated embodiment, for example, the server program instance, at step 420, compares an origin extracted from the connection request to an origin in a whitelist 421 of origins. If the extracted origin matches an origin in the whitelist control passes to step 424. Otherwise control passes to step 450 (FIG. 4B).

At step 424, the server program instance generates a response to accept the connection and completes the connection from the server side. For example, step 425 [,] updates the status of the server socket instance. The page and server program instances can then communicate over the established connection. According to one embodiment, the server program instances continues to monitor the connection (step 426) for messages. If no message is received over the connection for a predetermined amount of time, as determined at step 428, the server program instance closes the connection (step 430) and terminates (step 432).

Returning to step 420, if it is determined that the origin contained in a connection request does not match whitelist 421, control passes to step 450 (FIG. 4B). According to one embodiment, the server program instance is configured to present a security user interface that displays the origin extracted from the connection request and includes controls (radio buttons, menus or other controls) that allow the user to indicate whether the origin is approved. At step 452, the server program instance may receive a security input that is based on user interaction with the security interface, where the security input includes an indication of whether the origin extracted from the connection request is approved. If the origin is not approved as indicated by the security input, the server program instance rejects the request (step 430). If the security input indicates the origin of the connection request is approved, control can return to step 424 (FIG. 4A). In addition or in the alternative, the server program may be provided with a blacklist of origins such that server program instance denies connection requests containing blacklisted origins.

The steps of FIGS. 4A and 4B are merely an illustrative example and the disclosed subject matter is not limited to the ordering of or number of steps illustrated. Embodiments may implement additional steps or alternative steps, omit steps, or repeat steps.

Figure 5:
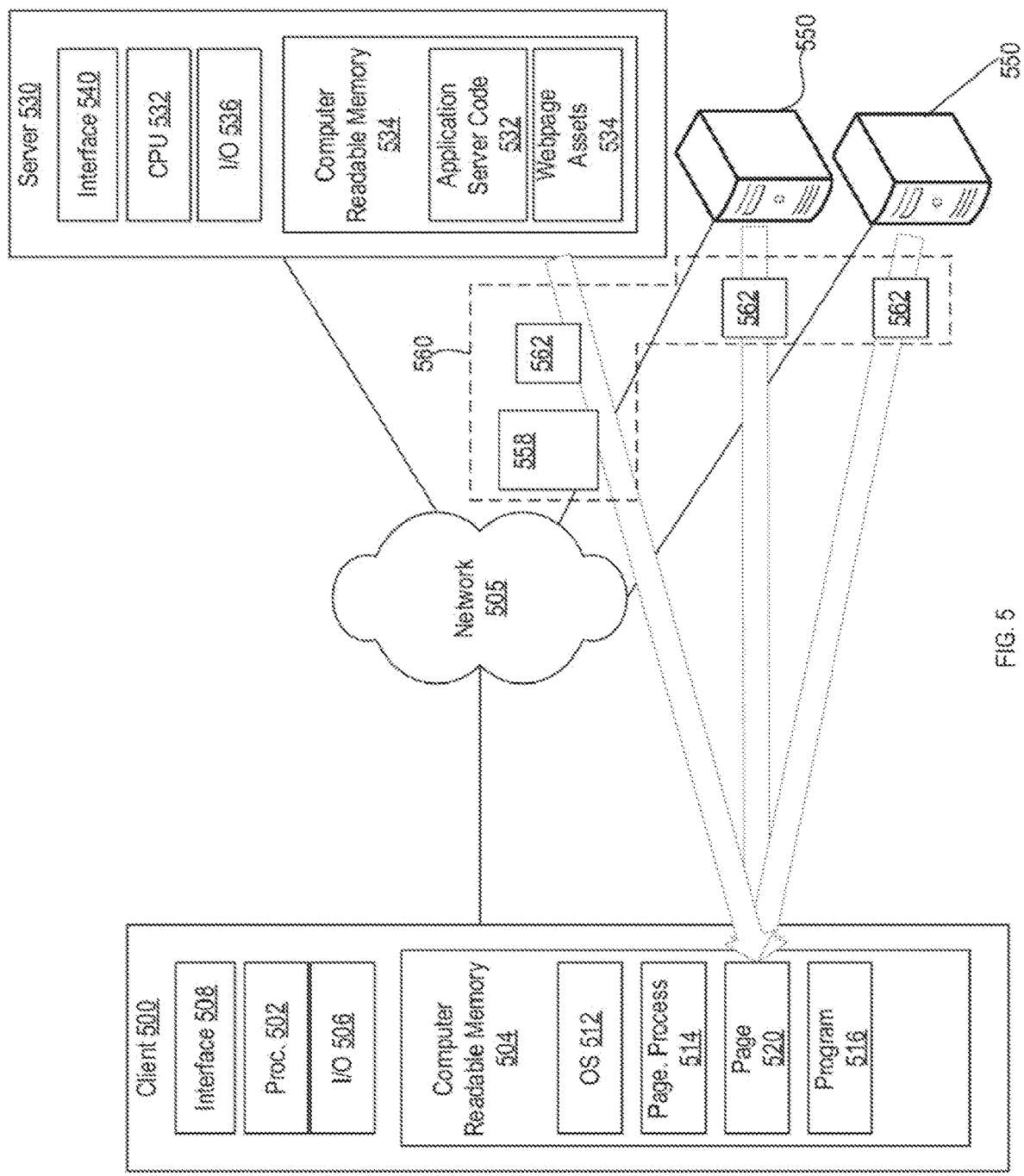
FIG. 5 is a flow chart illustrating one embodiment of a distributed network system.

Embodiments of the technology may be implemented on a computing system. Any combination of mobile desktop, server machine, embedded or other types of hardware may be used. FIG. 5 is a diagrammatic representation of one embodiment of a distributed network computing environment where embodiments disclosed herein can be implemented. The computing environment includes a client computer system 500 and a server computer system 530 connected to a network 505 (e.g., a local area network (LAN), a wide area network (WAN) such as the Internet, mobile network, or other type of network or combination thereof). Network 505 may represent a combination of wired and wireless networks that network computing environment may utilize for various types of network communications. Client computer system 500 may be an example of a computing device 100 of FIG. 1.

Client computer system 500 may include, for example, a computer processor 502 and associated memory 504. Computer processor 502 may be an integrated circuit for processing instructions, such as, but not limited to a CPU. For example, processor 502 may comprise one or more cores or micro-cores of a processor. Memory 504 may include volatile memory, non-volatile memory, semi-volatile memory or a combination thereof. Memory 504, for example, may include RAM, ROM, flash memory, a hard disk drive, a solid-state drive, an optical storage medium (e.g., CD-ROM), or other computer readable memory or combination thereof. Memory 504 may implement a storage hierarchy that includes cache memory, primary memory or secondary memory. In some embodiments, memory 504 may include storage space on a data storage array. Client computer system 500 may also include input/output ("I/O") devices 506, such as a keyboard, monitor, printer, electronic pointing device (e.g., mouse, trackball, stylus, etc.), or the like. Client computer system 500 may also include a communication interface 508, such as a network interface card, to interface with network 505.

Memory 504 may store instructions executable by processor 502. For example, memory 504 may include an operating system 512, a page processing program 514 (e.g., a web browser or other program capable of rendering pages) and a server program 516 configured to extend the functionality of page processing program 514. Further, memory may be configured with a page 520 processable (e.g., capable of being rendered by) by page processing program 514. Page 520 may be the local representation of a page 560, such as a web page, retrieved from the network environment. As will be appreciated, during rendering the page 520, page processing program 514 may request related resources, such as style sheets, image files, video files, audio files and other related resources as the page is being rendered and thus, code and other resources of page 560 may be added to page 520 as it is being rendered. Page 520 may be an example of web page 112.

Server computer system 530 may include, for example, a computer processor 532 and associated memory 534. Computer processor 532 may be an integrated circuit for processing instructions. For example, processor 532 may comprise one or more cores or micro-cores of a processor. Processor 532 may comprise a CPU. Memory 534 may include volatile memory, non-volatile memory, semi-volatile memory or a combination thereof. Memory 534, for example, may include RAM, ROM, flash memory, a hard disk drive, a solid state drive, an optical storage medium (e.g., CD-ROM), or other computer readable memory or combination thereof. Memory 534 may implement a storage hierarchy that includes cache memory, primary memory or secondary memory. In some embodiments, memory 534 may include storage space on a data storage array. Server computer system 530 may also include I/O devices 536. Server computer system 530 may also include a communication interface 540, such as a network interface card, to interface with network 505.

Memory 534 may store instructions executable by processor 532. For example, memory 534 may include an operating system and application server code 532. Application server code 532 can be executable to receive requests from client computers, such as client computer system 500, generate or server page files from a set of page assets 534

(e.g., complete web pages, page fragments, scripts or other assets) and return page files in response. A page file may reference additional resources, such as style sheets, images, videos, audio, scripts or other resources at server computer system 530 or at other network locations, such as at additional server systems 550.

According to one embodiment, the network environment may be configured with a page 560, such as a web page 560, configured to launch and connect to an instance of server program 516. Page 560 may include a page file 558 containing page code (HTML or other markup language, scripts or code), stored or generated by server computer system 530, that references resources 562 at server computer system 530 or other network locations, such as additional server computer systems 550. Page file 558 or a related resource 562 may include scripts or other code executable to launch and connect to an instance of server program 516.

According to one embodiment, page processing program 514 is executable by processor 502 to request a page from server computer system 530. Responsive to the request application server code 532 can return page file 558 for a page 560. Page processing program 514 can receive page file 558, store HTML, markup language or other page instructions from page file 558 as page 520 and begin rendering page 520.

During rendering, page processing program 514 can request related resources 562 from server computer system 530 or additional server systems 550. As resources are returned, instructions can be added to page 520 and page processing program 514 can continue to render page 520—or put another way, render page 560—until the page is fully rendered or another event occurs. Page 520 can be configured to launch and connect to an instance of server program 516 to provide additional functionality.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any hardware system, hardware mechanism or hardware component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system comprising:
 a processor configured to execute a web browser and a local server program;
 a computer readable memory coupled to the processor, the computer readable memory comprising a web page comprising executable instructions, the web page configured to:
  generate, by the web browser of an operating system and via executable instructions of the web page, connection configuration data usable by a local server program instance registered with the operating system, wherein the connection configuration data comprises:
   a port on which the local server program instance is to listen for a connection request while the port is randomly selected by a web page;
   a randomly generated launch id;
   a port number corresponding to the port; and
   a protocol specific to the web browser;
  launch, by the operating system, the local server program instance by using the connection configuration data, wherein the launching of the local server program instance further comprises associating the local server program instance with the protocol specific to the web browser;

send the connection data as a connection request originating from the web page using the protocol, wherein the connection request is sent to the local server program instance to establish a connection between the web browser and the server program instance;

based on an acceptance of the connection request by the server program instance, complete the connection, wherein the connection is usable for bi-directional communication between the web browser and the server program instance;

receive a connection configuration launch id and a connection configuration port number for a port from the operating system based on a request by the web page;

create a server socket instance bound to a loopback address;

listen on the server socket instance for the connection request on the port;

extract a connection request launch id from the connection request; and based on a determination that the connection configuration launch id and connection request launch id match, accept the connection request, wherein the port number is a random port number generated by the web page and the connection configuration launch id and connection request launch id comprise a string randomly generated by the web page.

2. The system of claim 1, wherein the web page is configured to compose a uniform resource locator (URL) including the port number on a local host and the launch id and create a client socket instance using the URL.

3. The system of claim 2, wherein the client socket instance is a client WebSocket instance.

4. The system of claim 3, wherein the connection request is an HTTP GET request that includes the randomly generated launch id.

5. The system of claim 1, wherein the web page is configured to launch the local server program instance and provide the connection data to the local server program instance by sending a launch request to the operating system to launch the local server program instance, the launch request including an indicator of the protocol that the local server program is registered to handle, the port number to be passed to the local server program instance and the launch id to be passed to the local server program instance.

6. The system of claim 1, wherein the local server program is executable to extract the connection configuration launch id and connection configuration port number from command line attributes from the operating system.

7. A method comprising:
executing, by a processor, a web browser;
rendering, by the web browser of an operating system, a web page, the web page comprising executable instructions;
generating, by the web browser via executable instructions of the web page, connection configuration data usable by a local server program instance registered with the operating system, wherein the connection configuration data comprises:

a port on which the local server program instance is to listen for a connection request while the port is randomly selected by a web page;
a randomly generated launch id;
a port number corresponding to the port; and
a protocol specific to the web browser;

launching, by the operating system, the local server program instance by using the connection configuration data, wherein the launching of the local server program instance further comprises associating the local server program instance with the protocol specific to the web browser;

sending the connection data as a connection request originating from the web page using the protocol, wherein the connection request is sent to the local server program instance to establish a connection between the web browser and the server program instance;

based on an acceptance of the connection request by the server program instance, completing the connection, wherein the connection is usable for bi-directional communication between the web browser and the server program instance;

receiving a connection configuration launch id and a connection configuration port number for a port from the operating system based on a request by the web page;

creating a server socket instance and binding the server socket instance to a loopback address;

listening on the server socket instance for the connection request on the port;

extracting a connection request launch id from the connection request; and based on a determination that the connection configuration launch id and connection request launch id match, accepting the connection request, wherein the port number is a random port number generated by the web page and the connection configuration launch id and connection request launch id comprise a string randomly generated by the web page.

8. The method of claim 7, further comprising composing, by the web page, a uniform resource locator (URL) including the port number on a local host and the launch id and creating, by the web page, a client socket instance using the URL.

9. The method of claim 8, wherein the client socket instance is a client WebSocket instance.

10. The method of claim 9, wherein the connection request is an HTTP GET request that includes the randomly generated launch id.

11. The method of claim 7, wherein launching the local server program instance and providing the connection data to the local server program instance comprises sending, by the web page, a launch request to the operating system to launch the local server program instance, the launch request including an indicator of the protocol that a local server program is registered to handle, the port number to be passed to the local server program instance and the launch id to be passed to the local server program instance.

12. The method of claim 7, wherein the local server program is executable to extract the connection configuration launch id and connection configuration port number from command line attributes from the operating system.

* * * * *